(12) United States Patent
Tanaya et al.

(10) Patent No.: US 6,427,662 B2
(45) Date of Patent: Aug. 6, 2002

(54) KNOCK CONTROL APPARATUS FOR INTERNAL COMBUSTION ENGINE

(75) Inventors: Kimihiko Tanaya; Yasuyoshi Hatazawa; Koichi Okamura; Mitsuru Koiwa, all of Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 67 days.

(21) Appl. No.: 09/726,519

(22) Filed: Dec. 1, 2000

(30) Foreign Application Priority Data

Jun. 15, 2000 (JP) ........................ 2000-179764

(51) Int. Cl.$^7$ ............................ F02P 5/152; G01L 23/22
(52) U.S. Cl. ................. 123/406.29; 701/111; 73/35.08; 73/117.3; 73/35.05; 123/406.35; 123/406.37
(58) Field of Search ..................... 123/406.29, 406.39, 123/406.21, 406.35, 406.37; 701/111; 73/117.3, 35.01, 35.03, 35.05, 35.06, 35.08

(56) References Cited

U.S. PATENT DOCUMENTS

| 4,523,566 A | * | 6/1985 | Kobayashi | .................. 73/35.03 |
| 5,694,900 A | | 12/1997 | Morita et al. | .......... 123/406.21 |
| 6,328,016 B1 | * | 12/2001 | Takahashi et al. | ..... 123/406.35 |
| 6,334,353 B1 | * | 1/2002 | Nobe et al. | ................. 73/35.04 |

FOREIGN PATENT DOCUMENTS

| JP | 2000-303941 | * | 10/2000 | ........... F02D/35/00 |
| JP | 2001-140740 | * | 5/2001 | ............ F02P/17/12 |

* cited by examiner

Primary Examiner—John Kwon
Assistant Examiner—Hieu T. Vo
(74) Attorney, Agent, or Firm—Sughrue Mion, PLLC

(57) ABSTRACT

A knock control apparatus for an internal combustion engine includes a knock detector for extracting a vibration component superposed on an ion current, and waveform shaping it at a predetermined threshold value to generate a train of knock pulses (Kp) of which the number of pulses indicates a knock intensity of a knock generated in the internal combustion engine, and an engine control unit for counting the number of knock pulses (npn) in the knock pulse train (Kp) output from the knock detector. The engine control unit judges, based on the number of knock pulses (npn), whether or not a knock is occurring. The engine control unit performs a peak hold of the number of knock pulses to calculate the knock judgement threshold value (BGL) by multiplying the number of pulses by ($\alpha$). Thus, precision in knock judgement is improved by performing knock judgement based on a maximum value (MAX) of the number of knock pulses (npn).

10 Claims, 11 Drawing Sheets

KNOCK CONTROL APPARATUS FOR INTERNAL COMBUSTION ENGINE

BACKGROUND OF THE INVENTION

1. Field of the Invention

The present invention relates to a knock control apparatus for an internal combustion engine which forms pulses of vibration components superposed on an ion current, and performs knock control on the internal combustion engine in accordance with the number of pulses. More specifically, the present invention relates to a knock control apparatus capable of performing stable knock control in the event that the number of pulses generated changes according to external factors (e.g., fuel, soiled spark plugs, etc.).

2. Description of the Related Art

It is known that with internal combustion engines, ions are generated by fuel combustion. Hence, these ions can be detected as an ion current by providing probes to which high voltage is applied within each cylinder of the engine. Further, it is known that a vibration component of the same vibration frequency as knocking is superposed onto this ion current, and this vibration component is extracted so as to perform knock control.

With general knock control apparatuses using ion current, a high voltage for detecting an ion current is generated using a secondary voltage generated by an ignition coil, and the high voltage is applied to spark plugs in cylinders of an internal combustion engine following discharge for ignition, thereby measuring the ion current. The vibration component of the knock frequency band is extracted from the ion current by a band-pass filter (BPF), amplified by an amplifier, and waveform shaped by comparison with a detecting threshold value to thereby generate knock pulses.

FIG. 10 illustrates the ion current waveform in the event that there is no knocking, the amplified vibration component, and knock pulses. FIG. 11 illustrates the waveform in the event that knocking is occurring. It can thus be understood from these figures that the knocking state can be detected by the number of knock pulses.

The knock pulses are sent to an engine control unit (hereinafter referred to as an ECU), so that is is judged whether or not knocking is occurring, and control of the ignition timing, i.e., knock control is performed based on the judgement results.

Conventional knocking judgement has been made on the basis of an average value (AVE) of the knock pulse number (npn) counted by the ECU and a dead band (OFS). The average value (AVE) of the knock pulse number is a learned value calculated from the running average of the knock pulse number (npn) for each cylinder, and is represented by the following expression.

Running average: $AVE=AVE+(npn-AVE)\times Kflt$ wherein Kflt is a correction coefficient, and is a value between 0 and 1.

On the other hand, the dead band (OFS) is a variable for absorbing irregularities in the knock pulse number (npn), and is a map value with the revolutions/minute and load of the internal combustion engine as parameters. Accordingly, the background level (BGL) is calculated for each cylinder using the following expression, thus performing knocking judgement using this background level.

$BGL=AVE+OFS$

FIG. 9 illustrates the transition in npn, AVE, and BGL in a state without knocking, obtained from an actual internal combustion engine. As shown in FIG. 9, large pulses occur intermittently, so the BGL makes transition at an extremely low level if there is only AVE. Accordingly, unnecessary retardation (noise retardation) occurs in the event that npn>BGL despite there being no knocking, consequently leading to loss of power of the engine. An OFS is set in order to prevent this from occurring, but as shown in FIG. 9, there is the tendency that the OFS becomes the dominant factor in determining the BGL.

The knock intensity (np) is represented by the following expression, and the retardation amount of the ignition timing is determined according to the np.

$np=npn-BGL$ (with restrictions of $np \geq 0$)

In the event that $np \geq 1$, i.e., when it is judged that knocking is occurring, the system switches Kf it which is used for calculating the AVE, thereby suppressing unnecessary rising of the BGL. Further, even in the case of np<1, Kf It is switched depending on whether $npn \geq AVE$ or $npn<AVE$.

Also, the retardation amount has a holding time with the revolutions/minute and load of the internal combustion engine as parameters, and in the event that retardation is not generated within this holding time anew, the retardation amount is decreased at a predetermined speed. In the event that new retardation is generated within the holding time, the holding time starts from that point.

Rapid changes in the driving conditions of the engine are generally judged based on the rate of change in the degree of opening of the throttle, and the rate of change in revolutions/minute. In the event that the ECU judges that a change more rapid than these conditions has occurred (transient state), the OFS map switches to a map for transition for a predetermined period. This is performed in order to keep the change in knock pulses generated by changes in operating conditions from being misjudged as knocking, and also to improve the detection of knocking occurring during transition.

With the above-described conventional method, the maximum value of AVE is npn even in the event that the follow-up of the AVE is maximized, and in order to avoid noise retardation due to irregularities in npn, the OFS must be more than the irregularities in npn.

However, in the event that the number of times of generation of npn changes due to the type of fuel or spark plugs, effects of soiled spark plugs, changes over time in the internal combustion engine, and so forth, the appropriate OFS changes as a matter of course, and accordingly there has been the problem that this method cannot deal with changes in the npn owing to external factors. In the event that the appropriate OFS becomes greater than the set value due to this factors, i.e., in the event that OFS is insufficient, the BGL approximates the npn due to the learning effect of the AVE, but the knock judging conditions switch Kflt at $np \geq 1$, so there has been the following problems: judgement that knocking is occurring is easily made even though within average irregularity ranges;

and retardation in ignition timing is generated and reaches the maximum value even though not in a state of knocking.

That is, even in the event that Kflt is changed to improve the follow-up of AVE, the maximum value of the AVE is npn and in order to prevent noise retardation due to irregularities in the number of knock pulses there is the need to have the OFS greater than the amount of irregularities, but the irregularities change according to various conditions.

Also, there is the problem that in the event that the OFS is set at the maximum irregularities for all cylinders due to the above reasons, if there is a state with few knock pulses or a cylinder with few knock pulses, detection of knocking, which is in fact occurring, becomes impossible.

SUMMARY OF THE INVENTION

Accordingly, the present invention is intended to solve the above problems, for example, by performing knock judgment based on a maximum value (MAX) of the number of knock pulses (npn).

Bearing the above in mind, according to the present invention, there is provided a knock control apparatus for an internal combustion engine comprising: a knock detector for extracting a vibration component superposed on an ion current, and waveform shaping it at a predetermined threshold value to generate a train of knock pulses (Kp) of which the number of pulses indicates an intensity of a knock generated in the internal combustion engine; and an engine control unit for counting the number of knock pulses (npn) in the knock pulse train (Kp) output from the knock detector, and judging, based on the knock pulse number (npn), whether or not a knock is occurring; wherein the engine control unit performs a peak hold of the knock pulse number to calculate the knock judgement threshold value (BGL) by multiplying the number of pulses by ($\alpha$).

Preferably, the knock judgement threshold value (BGL) is calculated by the following expression:

$$BGL=\alpha \times MAX+\beta$$

where $\alpha$ and $\beta$ are constants and MAX is a maximum value for the number of knock pulses (npn) in the knock pulse train (kp).

Also, MAX is updated for each combustion cycle, and in the event that the number of knock pulses (npn) currently generated is equal to or greater than a current value for MAX, the updating is performed according to the following expression:

$$MAX=MAX \times \epsilon 1+(npn-MAX) \times \epsilon 2$$

where $\epsilon 1$ and $\epsilon 2$ are correction coefficients.

Further, in the event that combustion cycles continue with the number of knock pulses (npn) being equal to or smaller than the MAX value, the MAX value is held for a predetermined period of time, and the MAX value is decreased at a predetermined speed ($\gamma$) after a lapse of the predetermined period of time.

Preferably, the engine control unit switches over at least one of the correction coefficients, depending on whether or not a S/N ratio (npn/BGL) represented by a ratio of the number of knock pulses (npn) and the knock judgement threshold value (BGL) is equal to or greater than a predetermined value ($\delta$).

Preferably, the engine control unit detects a knock in the event that the number of knock pulses (npn) is greater than the knock judgement threshold value (BGL) (npn>BGL), and generates an amount of retardation by which ignition timing of the internal combustion engine is retarded.

Preferably, the engine control unit calculates the knock intensity np by the following expression:

$$np=npn/MAX;$$

or by the following expression:

$$np=npn/BGL;$$

and generates the amount of retardation according to the knock intensity np thus calculated.

Preferably, the engine control unit sets an upper limit for the number of knock pulses (npn).

Preferably, the engine control unit does not update the MAX value but maintains the current MAX value in the event that restriction is applied at the upper limit value of the number of knock pulses (npn), and the engine control unit prohibits knock control in the event that abnormal ignition cycles of a predetermined number or more have occurred within a predetermined number of ignition cycles (i.e., (npn) is equal to or greater than a predetermined restriction value).

Preferably, the engine control unit also changes the values of the correction coefficients ($\epsilon 1$) and ($\epsilon 2$), which can be switched over by the S/N ratio of knock pulses, by the amount of retardation generated in the ignition timing as well.

Preferably, in the event that judgement is made that an engine operating condition is changing rapidly, the engine control unit decreases or increases at least one of the correction coefficients $\epsilon 1$ and $\epsilon 2$, the MAX value decreasing speed ($\gamma$) and the coefficient ($\alpha$) over a predetermined period of time.

Preferably, in the event that judgement is made that an engine operating condition is in a transient state, the engine control unit judges whether the engine operating condition is changing in a direction in which the number of knock pulses increases or decreases, and switches over parameters for determining the increasing or decreasing speed of BGL over a predetermined period.

The above and other objects, features and advantages of the present invention will be more readily apparent to those skilled in the art from the following detailed description of the preferred embodiments of the invention taken in conjunction with the accompanying drawings.

DESCRIPTION OF THE PREFERRED EMBODIMENTS

Now, preferred embodiments of the present invention will be described in detail with reference to the accompanying drawings.

First Embodiment

Figure 1:
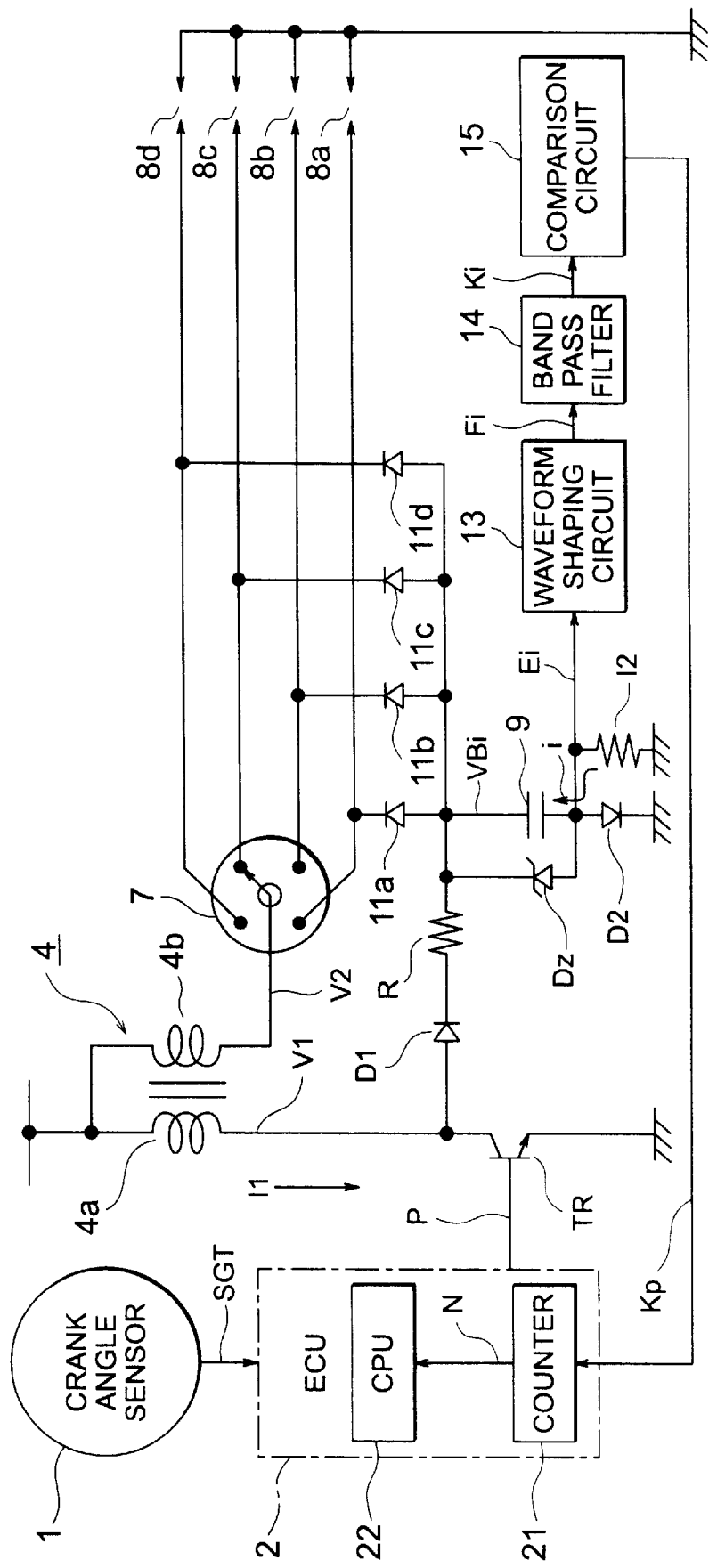
FIG. 1 is a diagram schematically illustrating the construction of a knock control apparatus according to the present invention.
Figure 2:
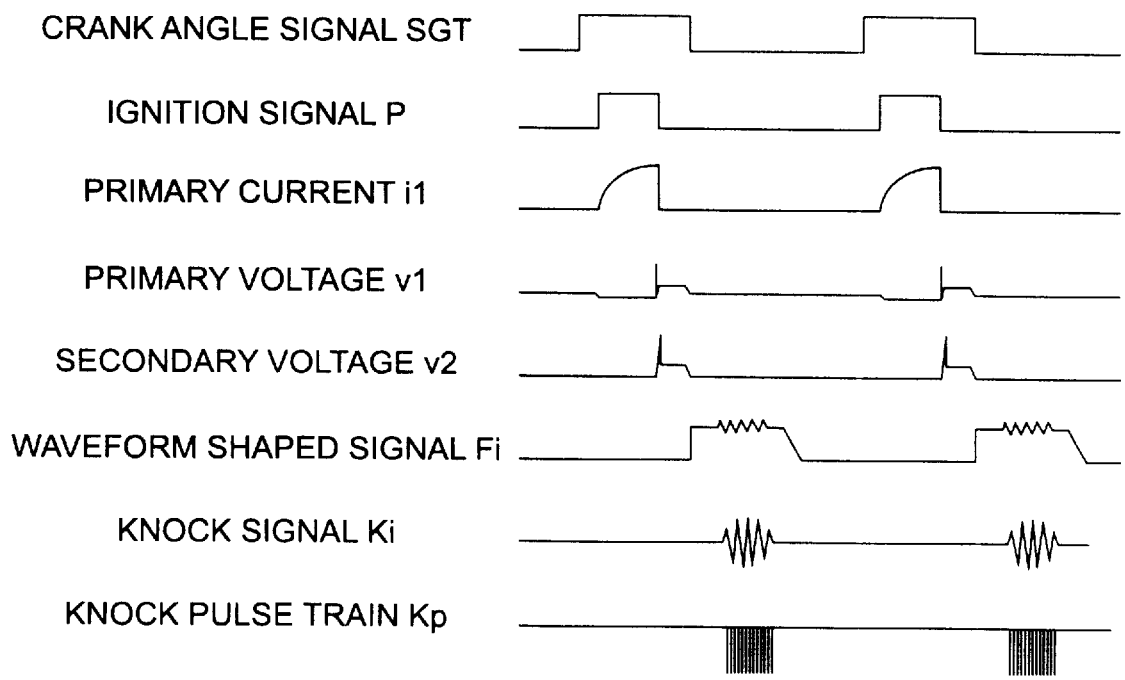
FIG. 2 is a timing chart illustrating the operating waveforms of the signals in FIG. 1.

FIG. 1 is a diagram schematically illustrating the construction of a knock control apparatus for an internal combustion engine according to the present invention, showing a case wherein a high voltage is distributed to spark plugs in cylinders via a distributor. FIG. 2 is a timing chart of the operating waveforms of the signals shown in FIG. 1, showing the state wherein knock signal waveforms are superposed on an ion current i.

In FIG. 1, a crank angle sensor 1 is provided on the crankshaft of the internal combustion engine (not shown), for outputting a crank angle signal SGT in the form of a pulse train including a number of pulses according to the number of revolutions per minute of the internal combustion engine.

The pulse edges of the crank angle signal SGT indicate prescribed crank angle reference positions of each cylinder of the internal combustion engine (not shown), and the crank angle signal SGT is input to an engine control unit (ECU) 2 in the form of a micro-computer, and are used for various control computations.

The engine control unit (ECU) 2 includes a counter 21 for counting the number N of pulses in a train of knock pulses Kp input from a later-described waveform processor, and a central processing unit (CPU) 22 for judging, based on the number of pulses N, whether or not a knock is occurring.

Also, along with taking in the crank angle signal SGT from the crank angle sensor 1, the ECU 2 also takes in operating information from various sensors (not shown), performs various computations in accordance with an operating condition of the internal combustion engine, and outputs drive signals to various actuators including the ignition coil 4 and so forth.

The drive signal to the ignition coil 4, i.e., ignition signal P, is applied to the base of a power transistor TR connected to the primary coil 4a of the ignition coil 4, so that the power transistor TR is controlled to turn on and off, thereby cutting off the primary current i1. Cutting of the primary current i1 causes the primary voltage V1 to rise, and the secondary coil 4b of the ignition coil 4 generates a further boosted secondary voltage V2 as a high ignition voltage (around 10 kV).

The distributor 7 connected to the output terminal of the secondary coil 4b sequentially distributes and applies the secondary voltage V2 to the spark plugs 8a through 8d within the cylinders synchronously with the rotation of the internal combustion engine, thereby generating discharge sparks within the combustion chambers of the ignition-controlled cylinders, thereby causing combustion of an air-fuel mixture therein.

A serial circuit made up of a rectifying diode D1 connected to one end of the primary coil 4a, a current-limiting resistor R, a condenser 9 connected in parallel to a voltage-limiting Zener diode DZ, and a rectifier diode D2, is connected from one end of the primary coil 4a to the ground to form a path for flowing charging current to the condenser 9 which acts as a bias power source for ion current detection.

The condenser 9 connected in parallel to both ends of the Zener diode DZ is charged to a predetermined bias voltage VBi (several hundreds volts) by charging current due to the primary voltage V1, so that it functions as a bias power source for detecting the ion current i, thus causing the ion current i generated by a discharge of ignited one of the spark plugs 8a through 8d to flow therethrough.

The high-voltage diodes 11a through 11d have their anodes connected to one end of the condenser 9 and their cathodes connected to one end of the spark plugs 8a through 8d, so as to have the same polarity as the ignition polarity. The resistor 12 for ion current detection that has been connected to the ether end of the condenser 9 performs voltage conversion of the ion current i and outputs this as ion current detection signals Ei.

The resistor 12 is connected to the other end of the spark plugs 8a through 8d via ground to form, along with the condenser 9 and high-voltage diodes 11a through 11d, a path for the ion current i to flow.

The ion current detection signal Ei output from the resistor 12 is waveform shaped into a signal Fi by means of the waveform shaping circuit 13, and thereafter a knock signal Ki alone is extracted via the band-pass filter 14, further converted into a train of knock pulses Kp by the comparison circuit 15, and input to the counter 21 in the ECU 2.

The waveform shaping circuit 13, band-pass filter 14, and comparison circuit 15 make up a waveform processor for extracting a train of knock pulses Kp from the ion current detection signal Ei. From the knock pulse train Kp, the ECU 2 counts the pulse number N, which is used for judging whether or not there is knocking, as described above.

The ECU 2 judges knocking from the knock pulse train output from the knock detector, and description thereof will be made with an example of processing of a certain particular cylinder.

First, a maximum (MAX) value is extracted from the number of knock pulses (npn) in the knock pulse train Kp output from the knock detector each time the particular cylinder in the internal combustion engine goes through a combustion cycle. The method for extracting the MAX value is as follows. The MAX value from the previous time (MAX[p]) and the current detection value of the knock pulse number (npn[c]) are compared, and in the event that $$MAX[p] \geq npn[c]$$

holds, the previous MAX value is held as the current MAX value (MAX[c]), and in the event that the holding period is over, this is decreased at a predetermined speed $\gamma$. That is, $$MAX[c] = MAX[p] - \gamma$$

On the other hand, in the event that $$MAX[p] < npn[c]$$

holds, MAX[c] is updated according to the following expression:

$$MAX[c] = MAX[p] \times \epsilon 1 + (npn[c] - MAX[p]) \times \epsilon 2$$

wherein $\epsilon 1$ and $\epsilon 2$ are correction coefficients.

Figure 4:
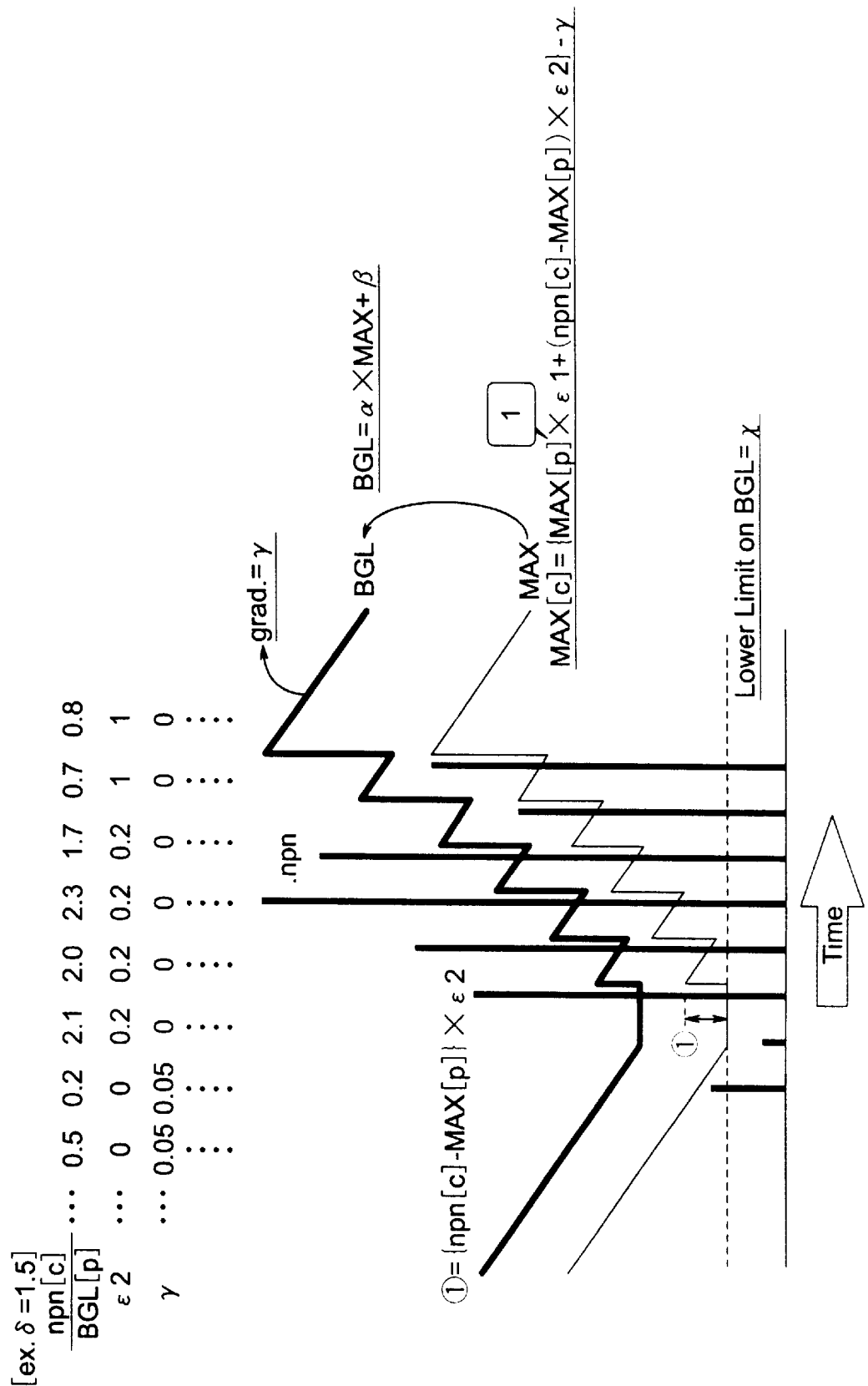
FIG. 4 is a diagram illustrating a transition in a MAX value according to the present invention.

FIG. 4 illustrates the updating of the MAX value. In the example in FIG. 4, zero or no ignition is made for the hold period for the MAX value so as to improve knock detection, but in the event that a sufficient S/N ratio is obtained for knocking, providing a holding period suppresses generation of noise retardation (i.e., retardation in ignition timing due to noise) and thus is advantageous.

Also, the decreasing speed $\gamma$ of the MAX value following the hold period is determined by the same reason as in the above-described holding period (i.e., balance between knock detection and noise retardation suppression). This decreasing speed $\gamma$ may be a map value which is determined according to the operating conditions of the internal combustion engine, or may be a function of the BGL, MAX value, and npn. For example, the decreasing speed may be determined according to the following expression:

Decreasing speed: $\gamma = (npn - MAX) \times \text{coefficient}$

Next, the BGL is calculated from the following expression.

$$BGL \alpha \times MAX + \beta$$

wherein $\alpha$ and $\beta$ are constants.

While FIG. 4 shows $\alpha = 1.2$ and $\beta = 1$, $\alpha$ and $\beta$ may be map values determined according to the operating conditions of the internal combustion engine.

It is known that with data having a proper distribution, MAX approximately equals the average value+$3\sigma$ (wherein σ is a sample reference value), but the coefficient α is a variable which changes the "3" in "average value+3σ"to 4, 5, and so forth, and β is for preventing the MAX value from being updated by noise constantly exceeding the BGL (i.e., prevents updating the MAX value while undergoing noise retardation).

In this way, setting β (the OFS in the conventional example) to a small level improves the follow-up of the BGL, and knocking can be detected in a stable manner even in the event that the state of knock pulses changes.

In the above MAX calculating expression, setting $\epsilon1=\epsilon2=1$ causes the BGL to change following the MAX value (i.e., npn), so detection of the first knock boosts the BGL, meaning that the knock detection while the BGL is decreasing becomes poor. Thus, in the event that knocking is detecting, correction is applied to the updating of the MAX value.

The judging conditions are $$npn/BGL \geq \delta$$

wherein δ is a constant.

This δ is the knock pulse S/N ratio, and is a map value between 1.5 to 1.2 which is determined by the operating conditions of the internal combustion engine. In the event that this judgement is satisfied, $\epsilon2=0.3$ is set so as to suppress the rising of the MAX value (BGL), thereby improving knock detection (with the present embodiment, $\epsilon1=1$ is set regardless of δ, and in the event that this judgement is not satisfied, $\epsilon2=1$ is set).

Figure 5:
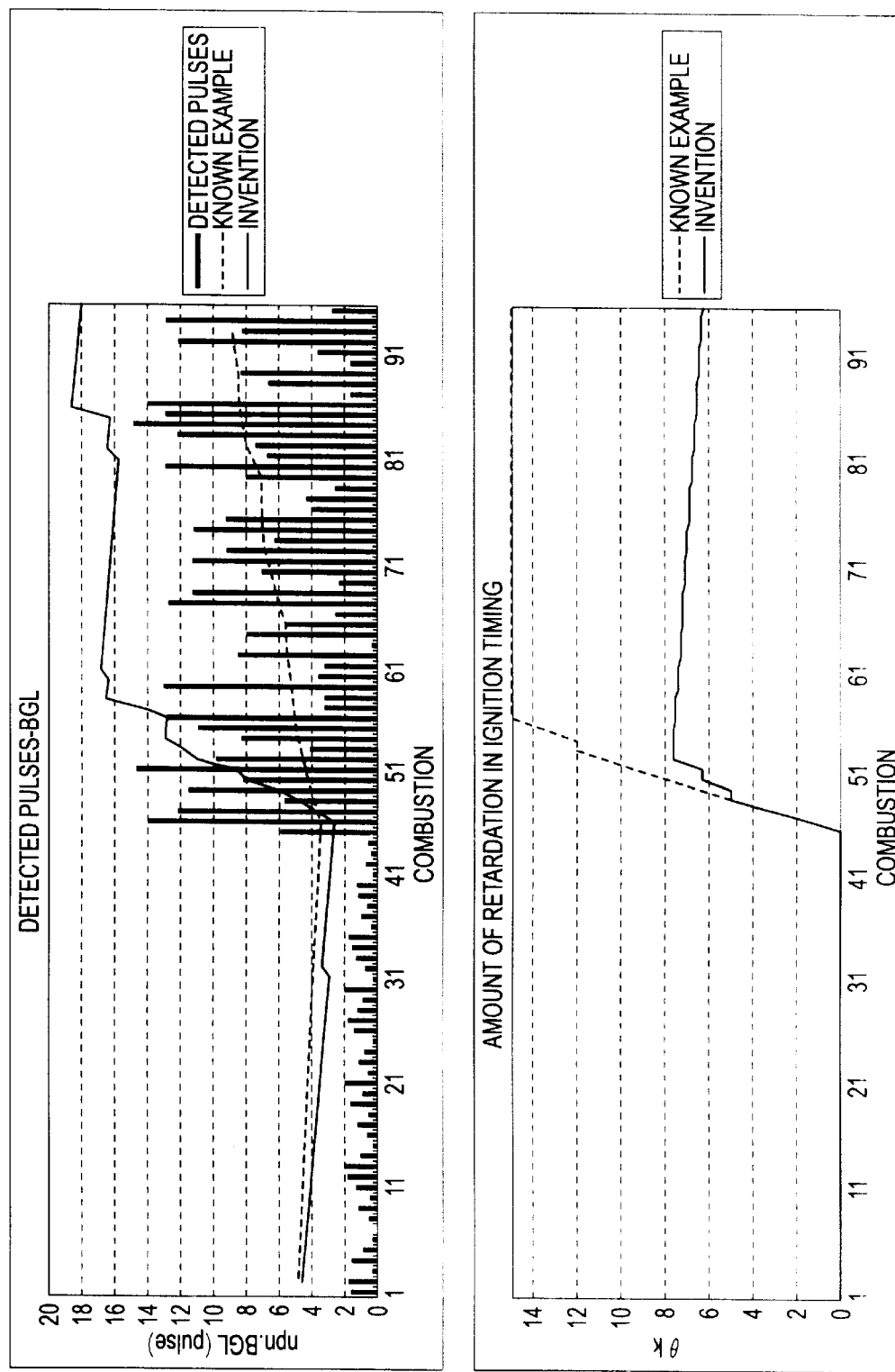
FIG. 5 is a diagram illustrating an example of avoiding noise according to the present invention.

Also, as shown in FIG. 5, in the event that retardation amount is generated, no more knocking occurs and the knock pulse number decreases, but in the event that the knock pulse number does not decrease, i.e., in the event that noise pulses are being generated, the BGL gradually increases and stabilizes at approximately a times of MAX, so generation of retardation amount due to noise can be avoided without depending on β (OFS). Incidentally, the solid lines and broken lines in the graph shown in FIG. 5 are the results of calculation of the present invention and of the conventional example.

Figure 3:
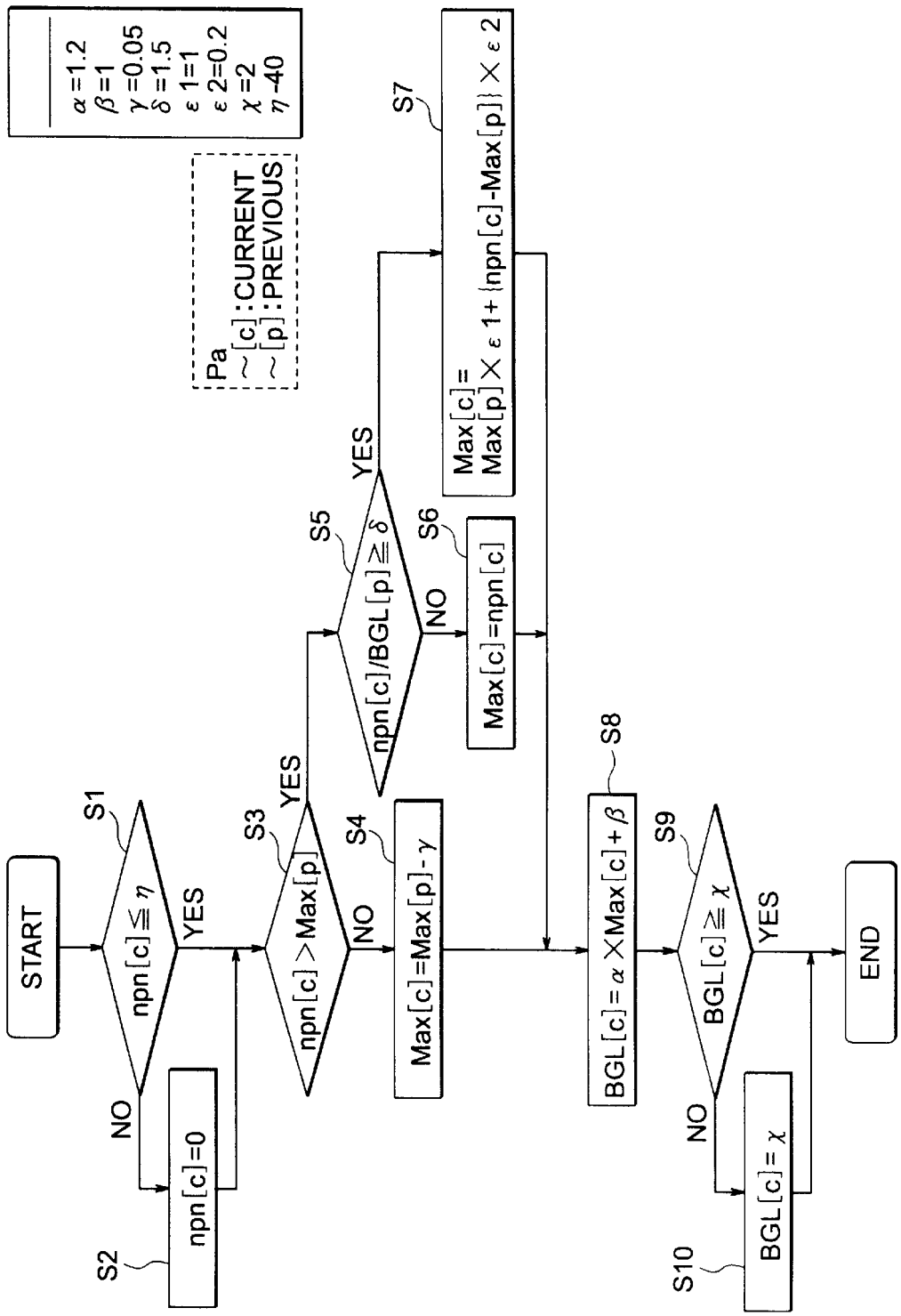
FIG. 3 is a flowchart for judging knocking according to the present invention.

FIG. 3 is a flowchart illustrating the above control operation. Next, the above control operation will be described concisely with reference to this FIG. 3.

First, in a particular cylinder in the internal combustion engine, comparison is made between the number pf knock pulses (npn[c]) in the knock pulse train Kp output from the knock detector for each combustion cycle in the internal combustion engine, and a predetermined value η(the theoretical maximum value of npn) (step S1), and in the event that npn[c]>η holds npn[c]=0 is set (step S2) and the flow proceeds to step S3, and on the other hand in the event that npn[c]≦η holds in step S1, the flow directly proceeds to step S3.

In step S3, comparison is made between npn[c] and the maximum value Max[p] of the previous npn, and in the event that Max[p]≧npn[c] holds the flow proceeds to step S4 and the current MAX value is held, which decreases at a predetermined speed following a predetermined holding period. That is to say, Max[c] is determined by the following expression:

$$Max[c]=Max[p]-\gamma$$

wherein γ is a predetermined value (MAX value decreasing speed).

Also, in the event that Max[p]<npn[c] holds in step S3, the flow proceeds to step S5, and comparison is made between npn[c]/BGL[p] and the predetermined value δ. In the event that npn[c]/BGL[p]<δ holds, MAX[c] is set to npn[c] in step S6, and the flow proceeds to step S8.

In the event that npn[c]/BGL[p]≧δ holds in step S5, the flow proceeds to step S7, and updates MAX[c] according to the following expression.

$$MAX[c]=MAX[p]\times\epsilon1+(npn[c]-MAX[p])\times\epsilon2$$

In step S8, BGL[c] is updated by the following expression.

$$BGL[c]\alpha\times MAX[c]+\beta$$

Next, in step S9, BGL[c] and a predetermined value χ are compared, and in the event that BGL[c]≧χ holds, the processing is ended, and in the event that BGL[c]<χ holds, the flow proceeds to step S1 in which BGL[c]=χ is set, and the processing is ended.

In the present first embodiment, the ratio of npn/BGL has been set for the knocking judgement condition, but similar results can be obtained by using npn/MAX instead of npn/BGL. Also, a lower limit is provided for the BGL (or MAX) so that the denominator of the division does not become zero. This lower limit may be a map value of the revolutions/minute and load of the internal combustion engine.

As with the conventional example, the knock intensity is represented by the following expression:

$$\text{knock intensity } (np)=npn+BGL.$$

The knock intensity (np) thus obtained is converted into a retardation amount, whereby ignition timing control is performed. A predetermined hold time is provided for this retardation amount, and after the lapse of the hold time, the retardation amount decreases at a predetermined speed.

Second Embodiment

With the above first embodiment, the knock intensity (np) is calculated by subtraction, so even with the same S/N ratio, a more retardation amount will be generated if the number of pulses is great. Conversely, under conditions wherein the number of pulses is small, a less retardation amount is generated even in the event that the S/N ratio is the same.

In order to solve this, an arrangement can be made wherein only knock judgement is made by the following expression:

$$np=npn-BGL,$$

and in the event that $$np>0$$

holds, the knock intensity is judged by the S/N ration from the following expressions, thereby improving knock control.

$$\text{knock intensity } (np)=npn/MAX,$$

or $$\text{knock intensity } (np)=npn/BGL$$

Third Embodiment With the above-mentioned first embodiment, in the event that an abnormality occurs in the knock pulses due to the effects of noise or the like, i.e., in the event that a normally inconceivable npn number is counted due to pulse fracturing or the like, the BGL rises drastically.

Accordingly, in a third embodiment of the invention, an upper limit is provided to the npn, and the MAX value is updated using this upper limit. As a consequence, the BGL can be prevented from rising drastically due to noise or the like, and the time necessary for the BGL to return to a proper value can be shortened, thereby preventing a deterioration in knock detection.

Fourth Embodiment

In a fourth embodiment of the invention, an upper limit is provided for the npn, and in the event that restriction is applied at the upper limit value, an assumption is made that an abnormality has occurred, and hence the MAX value is not updated, while maintaining the current value.

Also, in the event that the frequency (number of times) of abnormalities (the npn exceeding the upper limit) exceeds a predetermined value, knock control is prohibited. Thus, knock detection can be made even immediately following sporadic noise, and further knock control is prohibited when judgement is made that the abnormality detected is not an instantaneous abnormality, so the engine can be operated in a safer manner.

Fifth Embodiment

Figure 6:
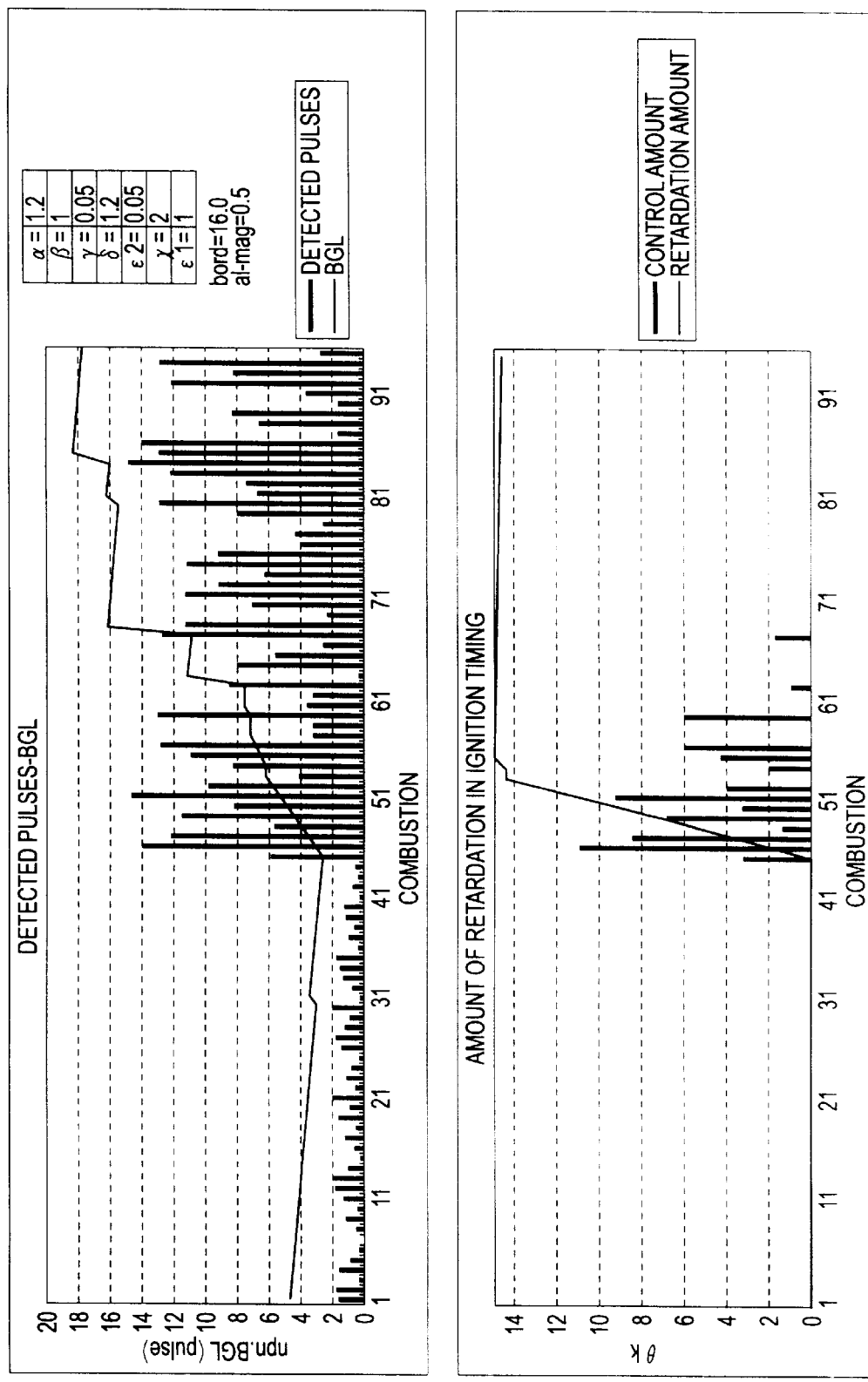
FIG. 6 is a diagram illustrating an operational example of the knock control apparatus according to the present invention (in the event that $\epsilon$ is great)

With the above-mentioned first embodiment, correction is performed with the S/N ratio (npn/BGL), but as shown in FIG. 6, while decreasing the correction coefficient $\epsilon 2$ improves knock detection, this lowers avoidance of noise.

Figure 7:
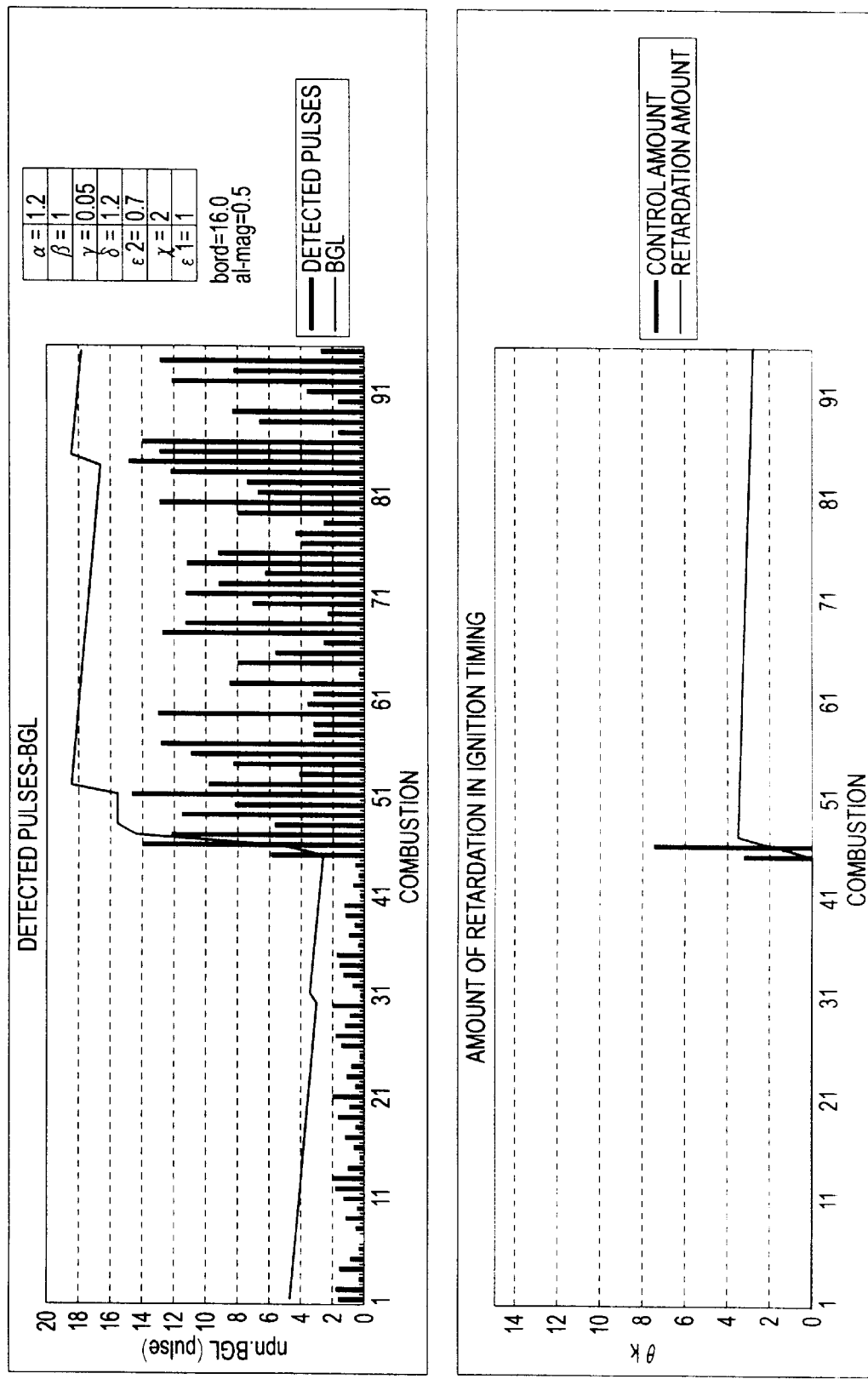
FIG. 7 is a diagram illustrating another operating example of the knock control apparatus according to the present invention (in the event that $\epsilon$ is small)

In FIG. 6, item "bord." represents the switchover point value, and item "al-mag." represents $\epsilon 2$ following switching. Also, conversely, as shown in FIG. 7, increasing the correction coefficient can avoid noise but causes a problem in that a sufficient retardation amount cannot be obtained in the event that knocking is occurring.

Accordingly, in the event that the retardation amount is equal to or below a predetermined value, an appropriate correction coefficient is set with priority placed on knock detection, and at the point where a sufficient retardation amount is obtained, the correction coefficient is switched over to avoid noise.

Providing the retardation amount for performing this switch-over with a hysteresis yields stable operations. Thus, both knock detection and noise avoidance can be had.

Figure 8:
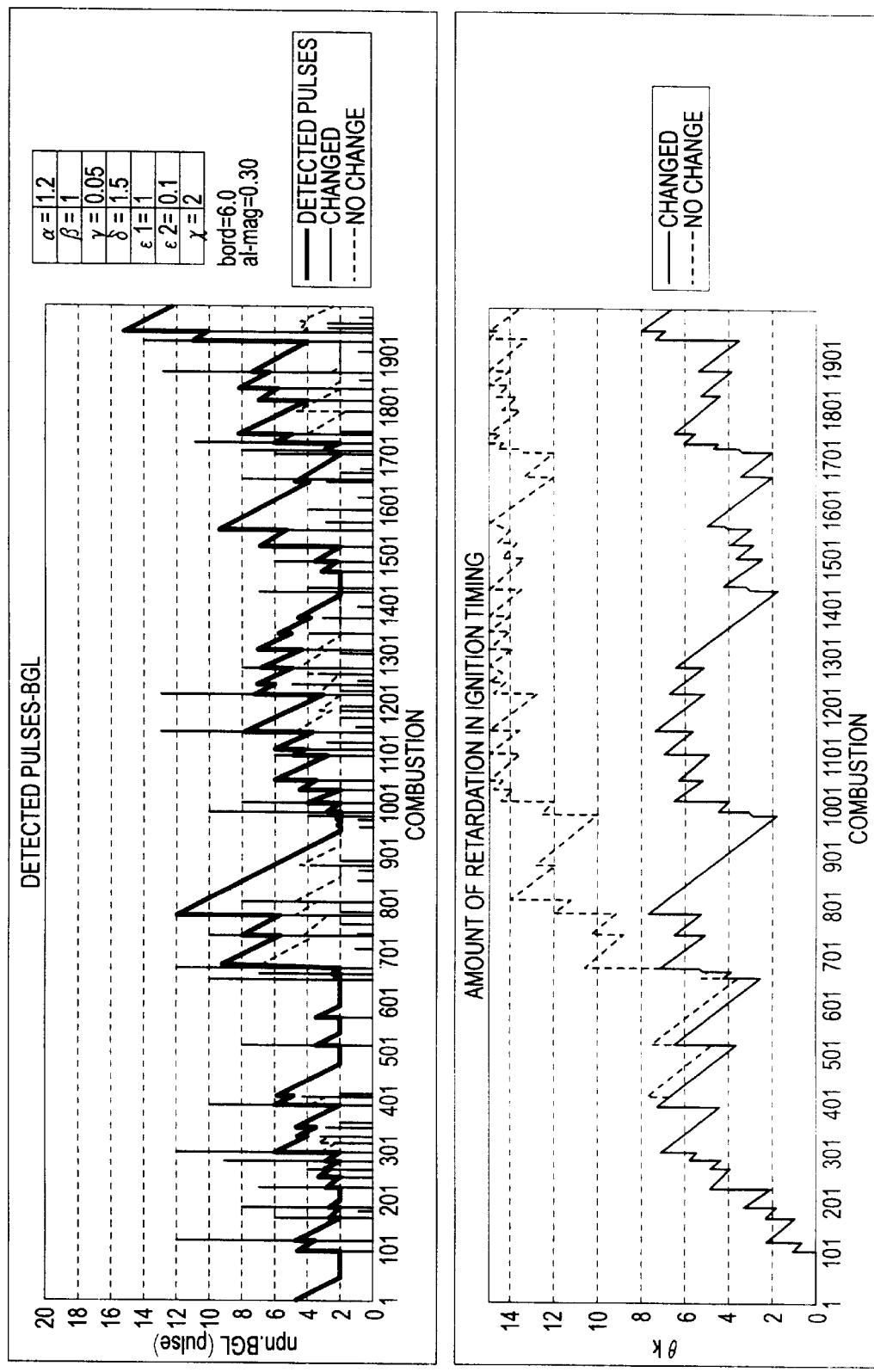
FIG. 8 is a diagram illustrating a further operating example of the knock control apparatus according to the present invention (in the event of switching $\epsilon$)
Figure 9:
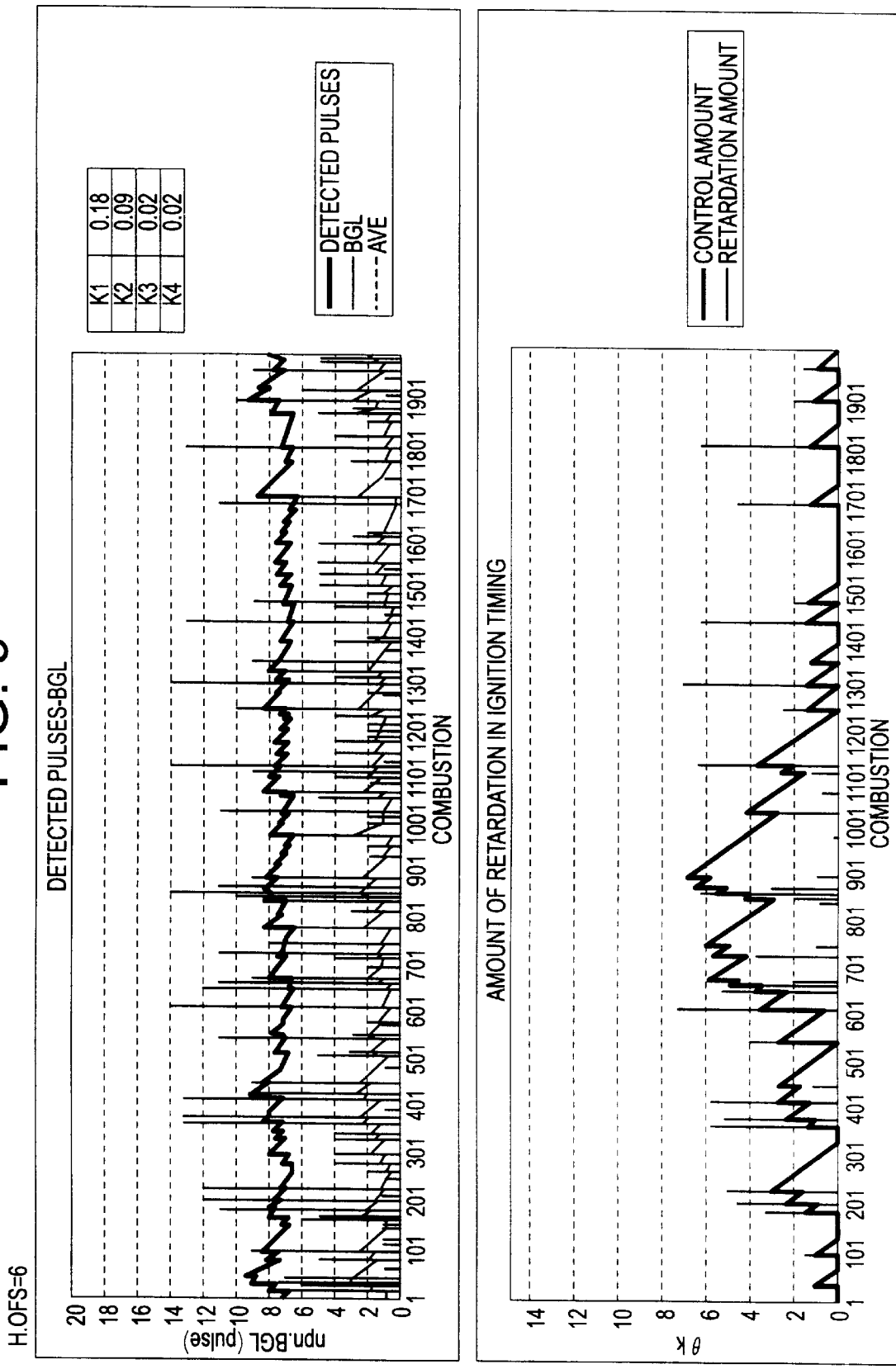
FIG. 9 is a diagram illustrating changes over time of npn, AVE, and BGL in the state of no knocking with a known knock control apparatus.
Figure 10:
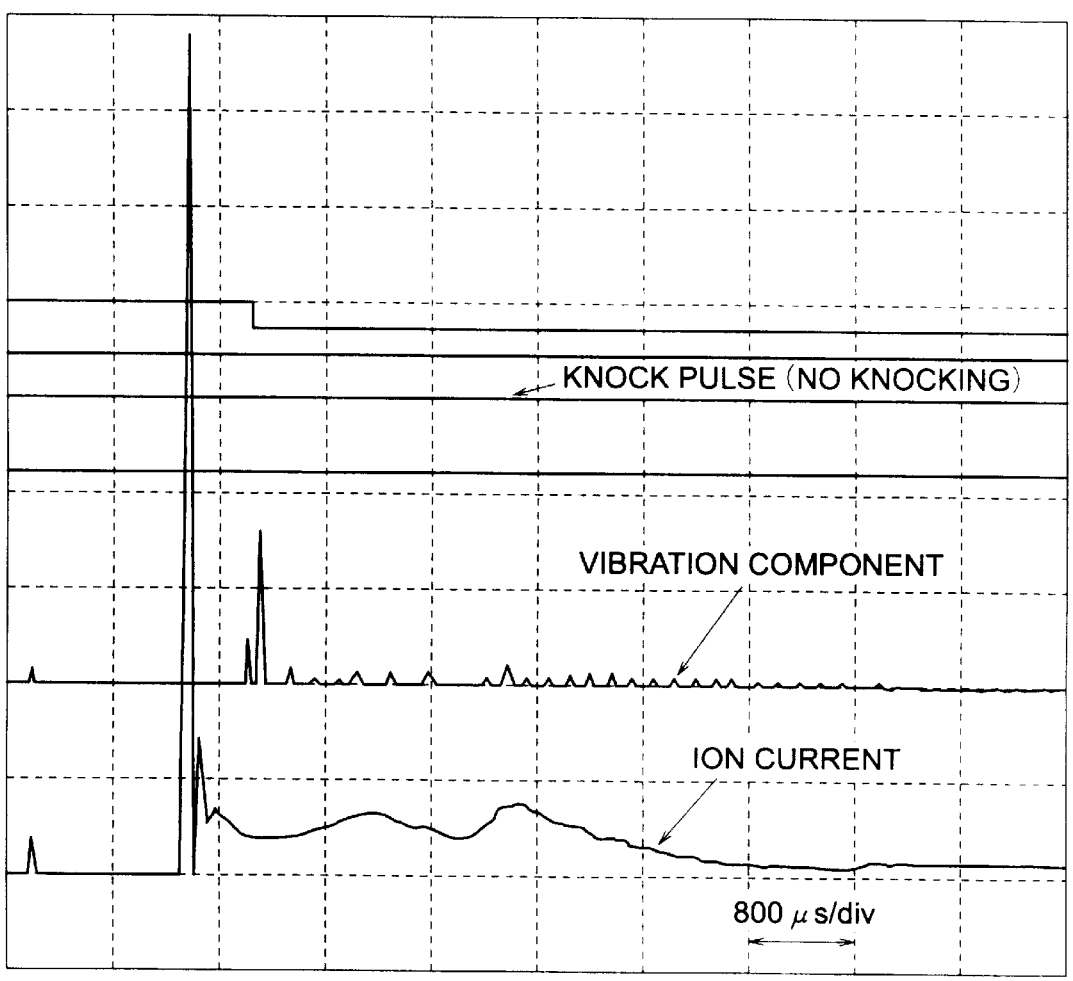
FIG. 10 is an ion current waveform diagram with no knocking occurring according to the known knock control apparatus.
Figure 11:
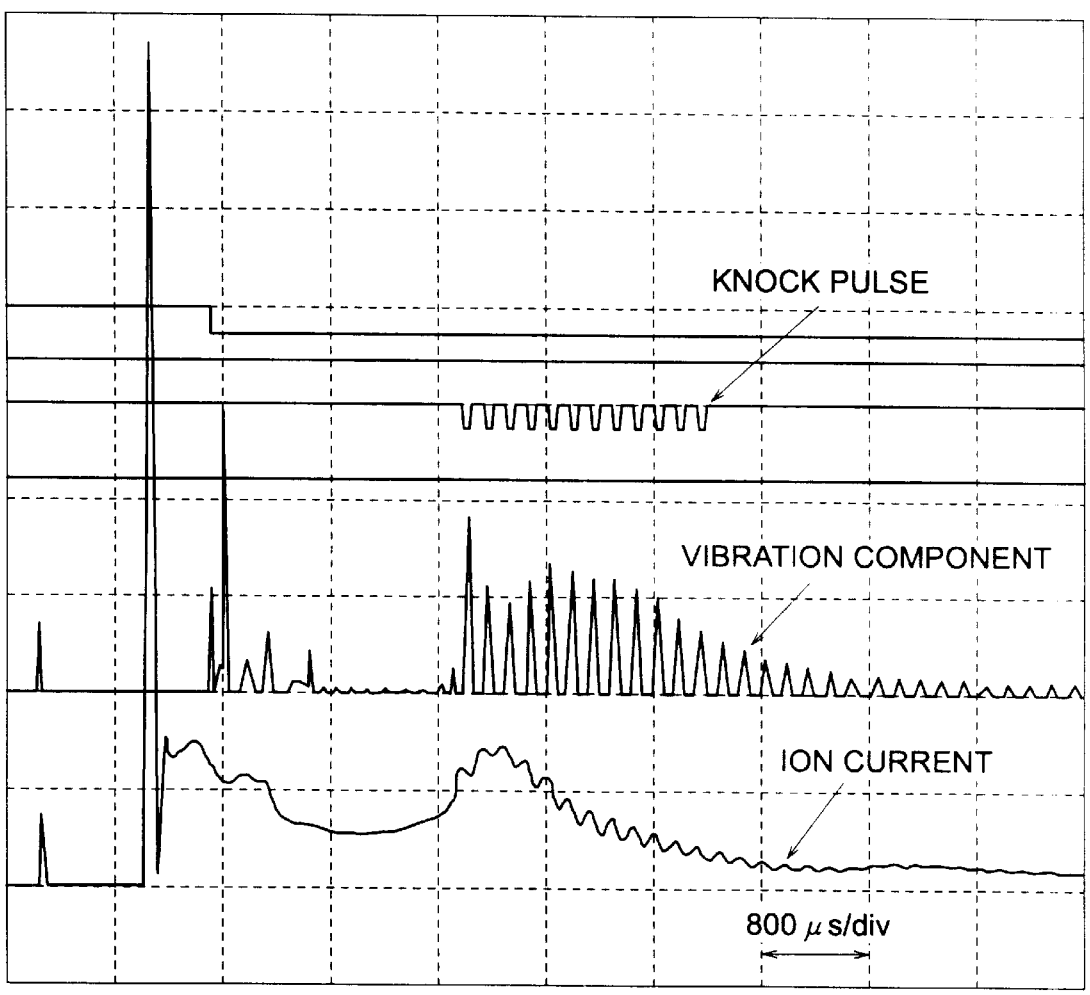
FIG. 11 is an ion current waveform diagram with knocking occurring according to the known knock control apparatus.

In FIG. 8, when the retardation amount is less than 6°, the correction coefficient $\epsilon 2$ is switched over for the retardation amount as well in the following manner:

$\epsilon 2 = 0.1$ at $S/N$ ratio $\geq \delta$ $\epsilon 2 = 1$ at $S/N$ ratio $< \delta$ also, in the event that the retardation amount is equal to or greater than 6°, $\epsilon 2 = 0.3$ at $S/N$ ratio $\geq \delta$ $\epsilon 2 = 1$ at $S/N$ ratio $< \delta$ Also, a hysteresis is provided such that, in the event that the retardation amount is equal to or greater than 6°, the correction coefficient $\epsilon 2$ is 0.3, and in the event that the retardation amount is less than 5°, the correction coefficient $\epsilon 2$ returns to 0.1.

Sixth Embodiment

The description so far has been made regarding cases wherein the operating condition of the internal combustion engine changes gradually, but a state wherein the engine operating condition changes rapidly (i.e., a transient state) will be described. A transient state is normally a state wherein the rate of change in the throttle valve is equal to or greater than a predetermined value, or the rate of change in the number of revolutions per minute (rpm) of the engine is equal to or greater than a predetermined value.

The number of knock pulses generated changes according to the operating condition of the internal combustion engine. For example, the number of pulses is small at low rpm, and the number of pulses increases as the rpm increases. Accordingly, in the transient state, the number of knock pulses greatly changes regardless of knocking.

Accordingly, increasing the correction coefficient $\epsilon 2$ for a predetermined period (or the number of times of ignition) from the point of judgement of the transient state in the state of S/N ratio $\geq \delta$ speeds up the rising of the BGL, thereby preventing unnecessary generation of the retardation amount in the transient state which would otherwise cause power loss. At this time, similar effects can be obtained by speeding up the rising of the BGL by reducing the MAX value decreasing speed ($\gamma$), or by increasing $\alpha$ or $\delta$.

Seventh Embodiment

In the above-mentioned sixth embodiment, the correction coefficient $\epsilon 2$ is increased in the state of S/N ratio $\geq \delta$ for a predetermined period from the point of judgement of the transient state, but the transient state is a state wherein knocking occurs readily. Accordingly, with a seventh embodiment of the invention, the correction coefficient $\epsilon 2$ is decreased for a predetermined period (or the number of times of ignition) from the point of judgement of the transient state in the state of S/N ratio $\geq \delta$, whereby the rising of the BGL is delayed, thereby preventing knocking to a maximum extent. At this time, similar effects can also be obtained by delaying the rising of the BGL while increasing the MAX value decreasing speed $\gamma$, or decreasing $\alpha$ or $\delta$.

Eighth Embodiment

In an eighth embodiment of the present invention, in the event that judgement of a transient state is made, the ECU 2 determines whether the operating condition of the internal combustion engine is changing in the direction of the number of knock pulses increasing or decreasing, and whether to facilitate the easiness in rising of the BGL or the easiness in dropping of the BGL is switched over for a predetermined period of time. Accordingly, in the event that judgement is made that the number of pulses has a tendency to rise, noise retardation can be prevented by changing the parameter settings and speeding up the rising of the BGL as with the above-mentioned sixth embodiment, and further, in the event that judgement is made that the number of pulses has a tendency to drop, knock detection can be improved by changing the parameter settings and speeding up the dropping of the BGL as with the above-mentioned seventh embodiment.

As described above, the knock control apparatus according to the present invention provides the following advantages.

The knock control apparatus of the invention comprises: a knock detector for extracting a vibration component superposed on an ion current, and waveform shaping it at a predetermined knock judgement threshold value to generate a train of knock pulses Kp of which the number of pulses indicates an intensity of a knock generated in the internal combustion engine; and an engine control unit for counting the number of pulses N in the knock pulse train Kp output from the knock detector, and judging, based on the number of pulses N, whether or not a knock is occurring; wherein the engine control unit performs a peak hold of the number of knock pulses to calculate the knock judgement threshold value BGL by multiplying the number of pulses by $\alpha$. With this arrangement, knocking can be detected in a stable manner even in the event that there is a change in an average value of the number of pulses npn, or in the event that a state of irregularities in the number of pulses changes to increase the number of knock pulses npn.

Also, the knock judgement threshold value (BGL) is preferably calculated by the following expression:

$$BGL = \alpha \beta MAX + \beta$$

where $\alpha$ and $\beta$ are constants, and MAX is a maximum value for the number of knock pulses npn in the knock pulse train kp; and MAX is updated for each combustion cycle, and in the event that the number of knock pulses npn currently generated is equal to or greater than the current MAX value, the updating is performed according to the following expression:

MAX=MAX×ε1+(npn−MAX)×ε2 where ε1 and ε2 are correction coefficients; and in the event that ignition cycles continue with the number of knock pulses npn being equal to or smaller than the MAX value, the MAX value is held for a predetermined period of time, and the MAX value is decreased at a predetermined speed (γ) after a lapse of the predetermined period of time.

With such an arrangement, the knock control apparatus is able to perform knock control in a satisfactory manner even with β(the OFS in conventional arrangements) is set to "1", so that knocking can be detected in a stable manner even in the event that the number of pulses becomes small. Also, in the event that the S/N ratio of the npn in a state without knocking is sufficiently great, a hold period can be provided to the MAX value, thereby improving knock detection. Further, setting the hold period to zero improves the follow-up of the MAX value to the npn, thereby achieving further improvements in knock detection.

Moreover, the engine control unit preferably switches over at least one of the correction coefficients ε1 and ε2, depending on whether or not the S/N ratio (npn/BGL) represented by a ratio of the number of knock pulses npn to the knock judgement threshold value BGL is equal to or greater than a predetermined value δ. Thus, in ignition cycles in which it is judged that there is knocking, performing correction when updating the MAX value allows noise to be avoided while maintaining good knock detection. Also, such a correction (switching of the correction coefficients) is performed based on the S/N ratio, so stable judgement can be made without being affected by the knock pulse number. Further, while with the conventional example, the OFS maps are switched over, but with the present invention, the coefficients alone are switched over so that the program for executing such control can be simplified.

Moreover, the engine control unit preferably detects knocking in the event that the number of knock pulses npn is greater than the knock judgement threshold value BGL (npn >BGL), and generates an amount of retardation amount by which ignition timing of the internal combustion engine is retarded.

Preferably, the knock intensity np is calculated by the following expression:

np=npn/MAX;

or by the expression:

np=npn/BGL;

and the engine control unit generates the amount of retardation according to the knock intensity np thus calculated, thereby preventing a decrease in the amount of retardation under an engine operating condition wherein the number of knock pulses is small, and also preventing generation of an excessive amount of retardation under an engine operating condition wherein the number of knock pulses is great.

Further, with the above calculation method, the BGL increases in the event that the npn increases drastically due to noise or the like, so knock detection deteriorates, but with the present invention, an upper limit is provided for the number of knock pulses npn, thereby preventing abnormal rising of the BGL and reducing the amount of time necessary for the BGL to settle down to a proper value, thereby preventing deterioration in knock detection.

Moreover, the engine control unit does not update the MAX value but maintains the current MAX value in the event that restriction is applied at the upper limit value of the knock pulse number npn, and further, in the event that abnormal ignition cycles of a predetermined number or more have occurred within a predetermined number of ignition cycles (i.e., npn is equal to or greater than a predetermined restriction value), knock control is prohibited, thereby judging as an abnormal condition a case wherein the npn increases drastically, i.e., case wherein the npn is equal to or greater than the upper limit, and prohibiting updating of the MAX value so as to prevent abnormal rising of the BGL, thus enabling knocking to be detected even immediately following the occurrence of abnormalities such as noise. Further, prohibiting knock control in the event that the frequency of abnormalities exceeds a predetermined value allows the internal combustion engine to be operated in a safer manner.

Preferably, the engine control unit also changes the values of the correction coefficients ε1 and ε2, which can be switched by the S/N ratio of knock pulses, by the amount of retardation generated in the ignition timing as well, thereby allowing noise to be avoided while ensuring reliable knock detection. That is, the rising of the BGL is slowed down at the time of rising of the retardation amount, and the rising speed of the BGL is increased at a point where a certain amount of retardation has been generated, thereby realizing both knock detection and noise avoidance.

Furthermore, in the event that judgement is made that the operating condition of the internal combustion engine is changing rapidly, the engine control unit preferably decreases at least one of the correction coefficients ε1 and ε2, the MAX value decreasing speed (γ) and the coefficient α, over a predetermined period of time, thereby delaying the rising of the BGL and increasing accuracy in knock detection while suppressing erroneous detection of knocking, or the engine control unit preferably increases at least one of the correction coefficients ε1 and ε2, the MAX value decreasing speed (γ) and the coefficient α, over a predetermined period of time, thereby speeding up the rising of the BGL and suppressing the generation of noise retardation (i.e., retardation in ignition timing due to noise), thus preventing power loss of the engine.

Moreover, in the event that judgement is made that the operating condition of the internal combustion engine is in a transient state, the engine control unit preferably judges whether the engine operating condition is changing in a direction in which the number of knock pulses increases or decreases, and switches parameters for determining the increasing or decreasing speed of BGL over a predetermined period, thereby enabling an appropriate amount of retardation to be obtained constantly.

What is claimed is:

1. A knock control apparatus for an internal combustion engine comprising:

a knock detector for extracting a vibration component superposed on an ion current, and waveform shaping it at a predetermined knock judgement threshold value (BGL) to generate a knock pulse train (Kp) of which the number of pulses indicates an intensity of a knock generated in the internal combustion engine; and an engine control unit for counting the number of knock pulses (npn) of the knock pulse train (Kp) output from said knock detector, and determining, based on the number of knock pulses (npn), whether a knock is occurring;

wherein said engine control unit performs a peak hold of the number of knock pulses to calculate said predetermined knock judgement threshold value (BGL) by multiplying the number of pulses by (α).

2. The knock control apparatus according to claim 1, wherein said predetermined knock judgement threshold value (BGL) is calculated by the following expression:

$$BGL = \alpha \times MAX + \beta$$

where $\alpha$ and $\beta$ are constants, and MAX is a maximum value for the number of knock pulses (npn) in the knock pulse train Kp; and wherein MAX is updated for each combustion cycle and in the event that the number of knock pulses (npn) currently generated is equal to or greater than a current MAX value, the updating is performed according to the following expression:

$$MAX = MAX \times \epsilon 1 + (npn - MAX) \times \epsilon 2$$

where $\epsilon 1$ and $\epsilon 2$ are correction coefficients; and wherein in the event that combustion cycles continue with the number of knock pulses (npn) being equal to or smaller than the MAX value, the MAX value is held for a predetermined period of time, and the MAX value is decreased at a predetermined speed ($\gamma$) after a lapse of the predetermined period of time.

3. The knock control apparatus according to claim 2, wherein said engine control unit switches over at least one of said correction coefficients, depending on whether or not an SN ratio (npn/BGL) represented by a ratio of the number of knock pulses (npn) to the knock judgement threshold value (BGL) is equal to or greater than a predetermined value ($\delta$).

4. The knock control apparatus according to claim 3, wherein said engine control unit also changes the values of the correction coefficients ($\epsilon 1$) and ($\epsilon 2$), which can be switched over by the S/N ratio of knock pulses, by the amount of retardation generated in the ignition timing as well.

5. The knock control apparatus according to claim 2, wherein said engine control unit detects a knock in the event that the number of knock pulses (npn) is greater than the knock judgement threshold value (BGL) (npn>BGL), and generates an amount of retardation by which ignition timing of the internal combustion engine is retarded.

6. The knock control apparatus according to claim 5, wherein said engine control unit calculates the knock intensity (np) by the following expression:

$$np = npn/MAX;$$

or by the following expression:

$$np = npn/BGL;\text{ and}$$

said engine control unit generates the amount of retardation according to the knock intensity (np) thus calculated.

7. The knock detecting device according to claim 1, wherein said engine control unit sets an upper limit for the number of knock pulses (npn).

8. The knock detecting device according to claim 7, wherein said engine control unit does not update said MAX value but maintains the current MAX value in the event that restriction is applied at the upper limit value of the number of knock pulses (npn), and said engine control unit prohibits knock control in the event that abnormal ignition cycles of a predetermined number or more have occurred within a predetermined number of ignition cycles.

9. The knock control apparatus according to claim 2, wherein, in the event that judgement is made that an operating condition of the internal combustion engine is changing rapidly, said engine control unit decreases or increases at least one of the correction coefficients ($\epsilon 1$) and ($\epsilon 2$), the MAX value decreasing speed ($\gamma$), and the coefficient ($\alpha$), over a predetermined period of time.

10. The knock control apparatus according to claim 2, wherein, in the event that judgement is made that an operating condition of the internal combustion engine is in a transient state, said engine control unit judges whether the engine operating condition is changing in a direction in which the number of knock pulses increases or decreases, and switches over parameters for determining the increasing or decreasing speed of the BGL over a predetermined period.

* * * * *